April 20, 1965          R. COMTOIS          3,179,535
METHOD OF BONDING AN ELECTRODE TO A CERAMIC BODY AND ARTICLE
Filed Nov. 4, 1960
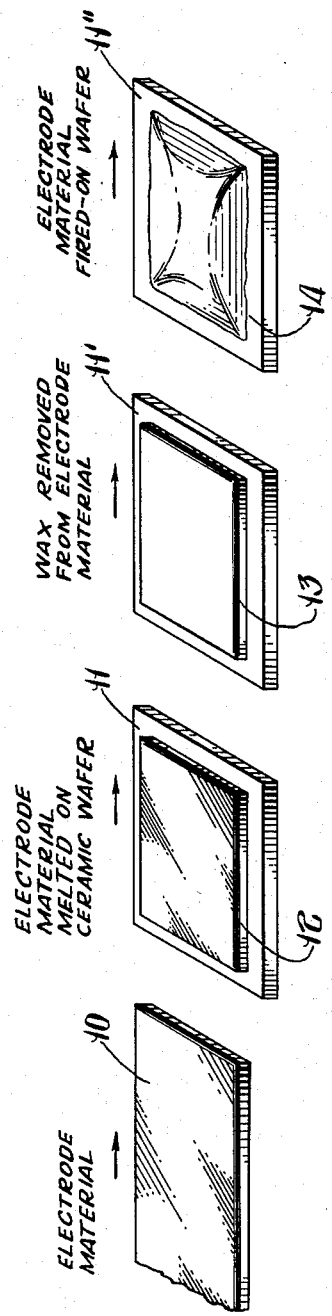
INVENTOR
*Raymond Comtois*
BY *Connolly and Hutz*
ATTORNEYS

United States Patent Office 3,179,535
Patented Apr. 20, 1965

3,179,535
METHOD OF BONDING AN ELECTRODE TO A CERAMIC BODY AND ARTICLE
Raymond Comtois, Nashua, N.H., assignor to Sprague Electric Company, North Adams, Mass., a corporation of Massachusetts
Filed Nov. 4, 1960, Ser. No. 67,313
2 Claims. (Cl. 117—227)

This invention relates to a means and method for the deposition of metal electrodes on refractory bodies and more particularly to the preparation and use of a ribbon of a solid state mixture to provide an electrode for a ceramic body.

The application of electrodes to ceramic materials, such as ceramic bodies, may be wasteful both in the loss of excess electrode material and also in damage to the ceramic body. It is important to be able to electrode a number of units in a continuous operation with a low loss of material and a high quality product. Consequently, the application of electrode material to ceramic material in an electroding process must be effective, accurate and not damage the ceramic while providing a reliable product.

Present methods of production are able to provide reliable products when they are produced by meticulous hand work. Electroding may also be carried out in a rapid mass production type of operation if the lack of uniformity and loss through damage is acceptable.

In a satisfactory electroded ceramic unit the electrode must be receptive to a solder connection, as well as adherent tenaciously to the ceramic body and resisting removal. The method of applying the electrode must not increase the power factor of the resultant unit. In a method for applying the electrode from a solid state mixture the mixture as applied to the ceramic for the deposition thereon is preferably of a nature which is susceptible to sharp cleavage as by cutting with a knife so that the solid state material can be readily formed to fit the electrode requirements of the unit under preparation.

It is an object of this invention to provide a means for applying an electrode material to a ceramic body from a solid state mixture.

It is another object of this invention to provide a high speed process for electroding a ceramic body.

Still another object of this invention is the provision of a solid formulation by means of which electrode material is applicable to a ceramic body from a solid state mixture.

A still further object of this invention is a process of preparing a solid state formulation containing an electrode material and applying the electrode material to the ceramic from the solid state mixture.

These and other objects of this invention will become more apparent upon consideration of the following description taken together with the accompanying drawing in which is shown a presentation of a solid state formulation juxtaposed with a series of ceramic bodies.

In general, this invention involves the preparation of a solid mixture of a light wax, an electrode material and a bonding frit into a form for application to a refractory material. The solid state mixture is shaped for application to the refractory and applied and subjected to a relatively low heat which removes the wax by floating it to the surface and oxidizing it. This is followed by firing the residue at a relatively high temperature to bond the electrode material to the refractory. The bonding agent is refractory in the melting temperature range of the wax and the electrode material remains unaffected throughout the process. As a result, the wax which is removed by melting and charring at the firing temperature leaves the unchanged material on the refractory and the bonding agent associated with the electrode material remains on the refractory to perform its function.

Novel electrodes on ceramics may be produced in accordance with the process of this invention by mixing a suitable electrode material, such as silver, with a light wax, such as some of the light paraffin waxes produced by Sun Oil Company, for example, Sunoco Wax #4415. The wax is melted and the metallic electrode material is mixed in the molten wax together with a suitable frit, such as bismuth trioxide. The components are well mixed and then the resultant slurry is allowed to cool and becomes solid at room temperature. Upon cooling of the mixture to a solid condition it may be formed by any suitable mechanical means into a continuous ribbon. The ribbon is made up of a substantially homogeneous mixture of the electrode material, the binder and the light wax. The solid mixture is suitably placed on a ceramic material as sections cut from the ribbon and this assembly of parts is placed in a kiln and heated from 300° F. to 350° F. for period sufficient to melt the wax and cause it to flow and become present on the upper surface of the mixture. In this position, the wax burns or chars at the temperature in the kiln and is removed from the mixture leaving the electrode material and the binder on the surface of the ceramic. After the removal of the wax, the ceramic material is subjected to further firing in the temperature in the range of 1500° F. and 1800° F. In this temperature range the binding agent melts and forms an electrode of the silver on the ceramic. The resultant electrode is strongly bonded to the ceramic and has good electrical properties. It is receptive to the attachment of lead-wire by soldering. The electrode has excellent conductivity and may be applied to a ceramic as thin as 3 mils.

Referring to the figure, a ribbon 10 of a mixture of the electrode material, frit and light wax is shown in association with three ceramic wafers 11, 11' and 11". The three wafers 11, 11' and 11" are representative of the stages of the application of the mixture to the ceramic bodies and the processing of the assembly to a final product. The ceramic wafer 11 has on its upper surface a section 12 cut from the ribbon 10 which has been heated to melt the wax and float the section to the surface. The ceramic wafer 11' is shown carrying the intermediate product 13 with the wax removed by oxidation. The wafer 11" carries a finished electrode which is produced by firing the wafer and the intermediate product permanently attaching the electrode 14 to the wafer 11".

The critical aspect of the invention is found in the use of the frit in the mixture. Also the firing temperature is important. In making electrodes containing silver a ratio of at least one part by weight of bismuth trioxide frit to 10 parts by weight of silver have been found to be essential in the production of a satisfactory finished product. Preferably the ratio is one part by weight of bismuth trioxide frit to seven parts by weight of silver. Moreover, it has been found important to provide a light paraffin wax in a proportion by weight greatly in excess to the bismuth trioxide frit but not in excess of the proportion of silver by weight. Thus, it has been found preferable to provide from one to two parts by weight of a light paraffin wax to two parts by weight of a silver flake particle and over one-fourth part by weight of bismuth trioxide frit. In the initial heating step the assembly of the mixture and the ceramic material are preferably heated to a range of 300° to 350° F. for a period of from 10 to 15 minutes to bring the wax to the surface of the mixture and to permit the wax to char away and allow the silver to settle onto the ceramic. In the second heating step the ceramic material carrying the residue from the mixture is subjected to a firing temperature of from 1500° to 1800° F. for a period of 10 to 15 minutes. In this second step the silver particles are bonded to the ceramic by the bismuth trioxide.

The following examples set forth formulations of the solid mixture according to this invention which provide a satisfactory means for applying a silver electrode to a ceramic body. These examples are by way of illustration and are not limitative.

*Example I*

2.00 g. of silver flake (Metals Disintegrading Grade MD-750) was mixed with .3 g. of bismuth trioxide and 1.5 g. of Sunoco #4415 wax. The wax was melted and mixed with silver and the bismuth trioxide while the wax was moltened. The mixture was cooled and pressed to a continuous ribbon over 3 mils thick. A section was cut from the ribbon and placed on a ceramic body and the ceramic body was heated to 350° C. and caused the mixture to melt from the bottom and the wax to flow out of the mixture and char. Then the silver and the bismuth trioxide were heated to 1700° C. and the silver permanently attached to the ceramic. The resultant electrode was attached to the ceramic secured against removal. A 90° pull of substantially more than half a pound on a lead-wire attached to the ceramic electrode was necessary to remove the electrode from the ceramic.

*Example II*

2.00 g. of silver flake (Metals Disintegrading Grade MD-750) was mixed with .2 g. of bismuth trioxide and 1.0 g. of Sunoco #4415 wax. The wax was melted and mixed with silver and the bismuth trioxide while the wax was moltened. The mixture was cooled and pressed to a continuous ribbon over 3 mils thick. A section was cut from the ribbon and placed on a ceramic body and the ceramic body was heated to 350° C. and caused the mixture to melt from the bottom and the wax to flow out of the mixture and char. Then the silver and the bismuth trioxide were heated to 1700° C. and the silver permanently attached to the ceramic. The resultant electrode was attached to the ceramic secured against removal. A 90° pull of substantially more than a half a pound on a lead-wire attached to the ceramic electrode was necessary to remove the electrode from the ceramic.

In the above examples small particles of silver were used as it has been found that this process produces superior results with electrodes formed of the specified material. Modification of these embodiments may be made, however, and satisfactory electrodes produced with other conventional electroding material.

The above described embodiments of this invention are set forth for the purpose of illustration. As many widely different embodiments of this invention may be made without departing from the spirit or scope hereof, it will be understood that it is intended the invention be limited only by the scope of the appended claims.

What is claimed is:

1. The method of bonding an electrode to a ceramic body which comprises applying a mixture consisting of approximately 7-10 parts by weight of small particles of an electrode material, about 1 part by weight of a bonding frit and about 5-10 parts by weight of a wax, heating said mixture at a temperature up to 350° F. to remove the wax from the other parts, subsequently heating the residue at a temperature in the range of 1500° to 1800° F. to form an electrode bonded to the ceramic body so as to resist separation by a 90° pull of at least one-half a pound.

2. The article prepared by the process of claim 1.

References Cited by the Examiner
UNITED STATES PATENTS

| 2,694,016 | 11/54 | Craven et al. | 117—46 |
| 2,837,487 | 6/58 | Huttar | 117—227 |
| 2,856,681 | 10/58 | Lacy | 117—227 |

FOREIGN PATENTS

| 625,198 | 6/49 | Great Britain. |
| 327,740 | 4/58 | Switzerland. |

RICHARD D. NEVIUS, *Primary Examiner.*